United States Patent
Ramalingam et al.

(10) Patent No.: US 10,013,765 B2
(45) Date of Patent: Jul. 3, 2018

(54) METHOD AND SYSTEM FOR IMAGE REGISTRATIONS

(71) Applicant: Mitsubishi Electric Research Laboratories, Inc., Cambridge, MA (US)

(72) Inventors: Srikumar Ramalingam, Cambridge, MA (US); Yuichi Taguchi, Cambridge, MA (US); Bharath Sankaran, Los Angeles, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/241,118

(22) Filed: Aug. 19, 2016

(65) Prior Publication Data
US 2018/0053293 A1 Feb. 22, 2018

(51) Int. Cl.
*G06K 9/00* (2006.01)
*G06T 7/00* (2017.01)
*G06K 9/46* (2006.01)

(52) U.S. Cl.
CPC .......... *G06T 7/003* (2013.01); *G06K 9/46* (2013.01); *G06K 2009/4666* (2013.01); *G06T 2207/20081* (2013.01)

(58) Field of Classification Search
CPC ............. G06K 9/46; G06K 2009/4666; G06T 2207/20081
USPC ....... 382/100, 104, 106, 159, 192, 173, 180, 382/103, 181, 224, 128, 195, 201, 199, 382/168, 170, 197, 203, 255
See application file for complete search history.

(56) References Cited

U.S. PATENT DOCUMENTS

| | | | |
|---|---|---|---|
| 6,711,293 B1 | 3/2004 | Lowe | |
| 8,687,892 B2 | 4/2014 | Demoulin et al. | |
| 9,361,692 B2* | 6/2016 | Suk | G06T 7/0028 |
| 2009/0238460 A1 | 9/2009 | Funayama et al. | |
| 2015/0036938 A1 | 2/2015 | Kim et al. | |
| 2016/0092727 A1* | 3/2016 | Ren | G06K 9/00369 382/103 |

OTHER PUBLICATIONS

E. Rublee, V. Rabaud, K. Konolige, and G. Bradski, ORB: An efficient alternative to sift or surf, International Conference on computer vision (ICCV), 2011.
(Continued)

*Primary Examiner* — Sheela C Chawan
(74) *Attorney, Agent, or Firm* — Gene Vinokur; James McAleenan; Hironori Tsukamoto

(57) ABSTRACT

An image registrations includes determining a first binary descriptor of a first key point in a first image, determining a second binary descriptor of a second key point in a second image, determining a weighted Hamming distance between the first binary descriptor and the second binary descriptor, and registering the first key point with the second key point when the weighted Hamming distance is below a noise threshold. At least one element in the first or the second binary descriptor is a result of a comparison of a difference between intensities of at least two pixels of the first or the second image with a threshold. At least two weights of the weighted Hamming distance for comparing at least two elements of the first or the second binary descriptors are different.

18 Claims, 8 Drawing Sheets

(56) References Cited

OTHER PUBLICATIONS

D. G. Lowe, Distinctive image features from scale-invariant keypoints, International Journal of Computer Vision (IJCV), vol. 60, No. 2, pp. 91-110, Nov. 2004.

M. Calonder, V. Lepetit, C. Strecha, and P. Fua, "BRIEF: Binary robust independent elementary features," in European Conference on Computer Vision (ECCV). Berlin, Heidelberg: Springer-Verlag, 2010, pp. 778-792.

* cited by examiner

METHOD AND SYSTEM FOR IMAGE REGISTRATIONS

FIELD OF THE INVENTION

This invention relates generally to computer vision, and more particularly to registration of different images.

BACKGROUND OF THE INVENTION

Image registration is the process of transforming different sets of data of different images into one coordinate system. Data may be multiple photographs, data from different sensors, times, depths, or viewpoints. The image registration is used in computer vision, medical imaging, biological imaging and brain mapping, and compiling and analyzing images and data from satellites. Registration is necessary in order to be able to compare or integrate the data obtained from these different measurements and to perform various computer vision actions.

Image registration or image alignment algorithms can be classified into intensity-based and feature-based. One of the images is referred to as the reference or source and the others are respectively referred to as the target, sensed or subject images. Image registration involves spatially registering the target image(s) to align with the reference image. Intensity-based methods compare intensity patterns in images via correlation metrics, while feature-based methods find correspondence between image features such as points, lines, and contours. Intensity-based methods register entire images or sub-images. If sub-images are registered, centers of corresponding sub images are treated as corresponding feature points. Feature-based methods establish a correspondence between a number of especially distinct points in images. Knowing the correspondence between a number of points in images, a geometrical transformation is then determined to map the target image to the reference images, thereby establishing point-by-point correspondence between the reference and target images.

Feature descriptors of the feature-based image registration methods are used in a variety of imaging applications, including object recognition applications, 3D reconstruction applications, image retrieval applications, camera localization applications, and the like. Such feature descriptors may be used to compute abstractions of image information. The widespread use of feature descriptors has driven the development of a large number of alternative descriptors that are based on various concepts, such as Gaussian derivatives, moment invariants, complex features, phase-based local features, or the like. However, efficient descriptors are expected to have low computational complexity, easy matching characteristics, and high memory efficiency. Current descriptors generally do not include all of these qualities.

In addition, because images captured in the information processing apparatus, e.g., cameras, may be affected by various environmental factors such as their sizes, illuminations, obstacles, rotations, etc., it may have numerous difficulties to recognize objects in the images robustly. Thus, conventional feature point extraction methods such as Scale Invariant Feature Transform (SIFT), Speeded Up Robust Features (SURF), and Oriented FAST and Rotated BRIEF (ORB) have been used for recognizing objects and registering the images.

The SIFT is a method for extracting feature points which can be applied to an image processing system such as a surveillance camera or an autonomous navigation system. The SIFT derives a high-order descriptor from feature points of the objects in the image. Also, the SURF is a method for extracting feature points which can be applied to an image processing system such as an object tracking system or a panorama image generating system. In the SURF, objects can be recognized by generating an integral image to which pixel values from an input image are summed and deriving feature points and a high-order descriptor according to each scale of the integral image.

Although the techniques SIFT and SURF have advantages that they are robust to image (or, object) size, illumination, and changes of image due to rotations, they have disadvantages that complex computation is required for implementing their algorithm, and computational speed may significantly degrade as the number of feature points increases. Also, it is difficult that the techniques are used for real-time processing in a mobile communication terminal having a low computational ability or a mobile environment with a limited power supply.

For example, the SIFT descriptor is highly discriminative but, being a 128-vector, is relatively slow to compute and match descriptors. The SURF descriptor is faster to compute and match descriptors. However, since the SURF descriptor is a 64-vector of floating point values, it is represented by 256 bytes. This size may become costly as the number of descriptors to be stored increases. Several other extensions of SIFT have also been proposed, including dimensionality reduction techniques, quantization based techniques, descriptor binarization techniques, and the like. However, these techniques remain time and computation consuming.

Therefore, binary descriptors have been proposed. For example, in the ORB, in order to recognize objects, feature points are extracted by FAST or BRIEF methods to generate a binary descriptor. The ORB technique enhances a speed of recognizing objects in an input image as compared to the SIFT and SURF which use the high-order descriptor. Pixel comparisons are faster to determine than gradient operations, which are used in common gradient based descriptors, e.g., ORB is two orders of magnitude faster than SIFT, without losing much on the performance with respect to keypoint matching, see E. Rublee, V. Rabaud, K. Konolige, and G. Bradski, "ORB: An efficient alternative to sift or surf," in International Conference on Computer Vision (ICCV), 2011, D. G. Lowe, "Distinctive image features from scale-invariant keypoints," International Journal of Computer Vision (IJCV), vol. 60, no. 2, pp. 91-110, November 2004. However, the accuracy of image registration with binary descriptors such as ORB is lower than the accuracy of other methods, such as SIFT and SURF. Accordingly, there is a need to improve the accuracy of the image registration with binary descriptors while maintaining their computational efficiency. In addition, there is a need to develop customized descriptor parameters that will allow accurate performance with different image capture settings (different cameras, viewpoints, times, etc.).

SUMMARY OF THE INVENTION

The advent of binary descriptors in computer vision has led to faster solutions for registering key points in different images. Though binary descriptors can be determined at almost two orders of magnitude faster than conventional gradient based descriptors, they suffer from poor matching accuracy in challenging conditions.

Some embodiments of the invention provide a method and system for improving binary descriptors in their computation and matching that enhance their performance without compromising speed of the computation. Different embodiments use different binary descriptors, because all binary descriptors only vary by the way the pairwise pixels are sampled from a given image patch. For example, one embodiment is applied to the ORB descriptor. The embodiment provides several extensions to improve the performance of the ORB descriptor by learning a small number of parameters, without making the descriptor computation slower.

Some embodiments of the invention are based on recognition that the computation of the binary descriptor should be sensitive to a manner and/or timing of capturing the images causing various distortions of the images of the same scene. For example, intensities of pixels in the different images captured at different times can vary due to light variation at those times even if those pixels correspond to the same point in a scene. To that end, some embodiments realized that such variations can be learned and considered during the computation of the binary descriptors.

For example, one embodiment determines a binary descriptor of a key point in an image using a comparison of a difference between intensities of at least two pixels of the image with a non-zero threshold. Such a non-zero threshold allows compensating for different distortions in the different images of the scene.

Some embodiments are based on another realization that distortion of the images can affect pixels for different key points of the scene differently. For example, in a scene satisfying Manhattan world assumption (buildings with orthogonal walls), the pixel differences along horizontal direction is more useful than the pixel differences along vertical direction. To that end, some embodiments realized that such a difference can be learned and considered during the comparison of the binary descriptors.

For example, one embodiment compares the binary descriptors using a weighted distance, e.g., a weighted Hamming distance. Such a comparison allows for determining different weights for comparing different elements of the binary vectors. The difference in the weights can encode the difference in importance of different pixels.

Separately or in combination, such a thresholded weighted difference improves the accuracy of the image registration using binary descriptors while maintaining its efficiency. For example, one embodiment learns the weights of the weighted Hamming distance from training data using a max-margin network learning. During that learning, the embodiment can use different threshold values to improve the registration. Additionally, or alternatively, some embodiments determine different values for the threshold and/or the weights of the weighted distance for images captured at different times of a date, at different seasons of the year, at different lighting conditions, and for different types of scenes, and use different values to register different images.

Accordingly, one embodiment of the invention discloses a method for image registrations. The method includes determining a first binary descriptor of a first key point in a first image, wherein at least one element in the first binary descriptor is a result of a comparison of a difference between intensities of at least two pixels of the first image with a threshold, wherein the threshold is greater than or equal to zero; determining a second binary descriptor of a second key point in a second image, wherein at least one element in the second binary descriptor is a result of a comparison of a difference between intensities of at least two pixels of the second image with the threshold; determining a weighted distance between the first binary descriptor and the second binary descriptor, wherein at least two weights of the weighted distance for comparing at least two elements of the first and the second binary descriptors are different; and registering the first key point with the second key point when the weighted distance is below a noise threshold. At least some steps of the method are performed using a processor.

Another embodiment discloses a system for image registrations. The system includes an input interface for acquiring a first image and a second image; a processor for determining a first binary descriptor of a first key point in a first image, determining a second binary descriptor of a second key point in a second image, determining a weighted Hamming distance between the first binary descriptor and the second binary descriptor, and registering the first key point with the second key point when the weighted Hamming distance is below a noise threshold, wherein at least one element in the first or the second binary descriptor is a result of a comparison of a difference between intensities of at least two pixels of the first or the second image with a non-zero threshold, and wherein at least two weights of the weighted Hamming distance for comparing at least two elements of the first or the second binary descriptors are different; and an output interface for executing a computer vision action based on the image registrations.

Yet another embodiment discloses a non-transitory computer readable storage medium embodied thereon a program executable by a processor for performing a method that includes determining a first binary descriptor of a first key point in a first image, wherein at least one element in the first binary descriptor is a result of a comparison of a difference between intensities of at least two pixels of the first image with a threshold, wherein the threshold is greater than or equal to zero; determining a second binary descriptor of a second key point in a second image, wherein at least one element in the second binary descriptor is a result of a comparison of a difference between intensities of at least two pixels of the second image with the threshold; determining a weighted Hamming distance between the first binary descriptor and the second binary descriptor, wherein at least two weights of the weighted Hamming distance for comparing at least two elements of the first and the second binary descriptors are different; and registering the first key point with the second key point when the weighted Hamming distance is below a noise threshold.

DETAILED DESCRIPTION OF THE PREFERRED EMBODIMENTS

Figure 7:
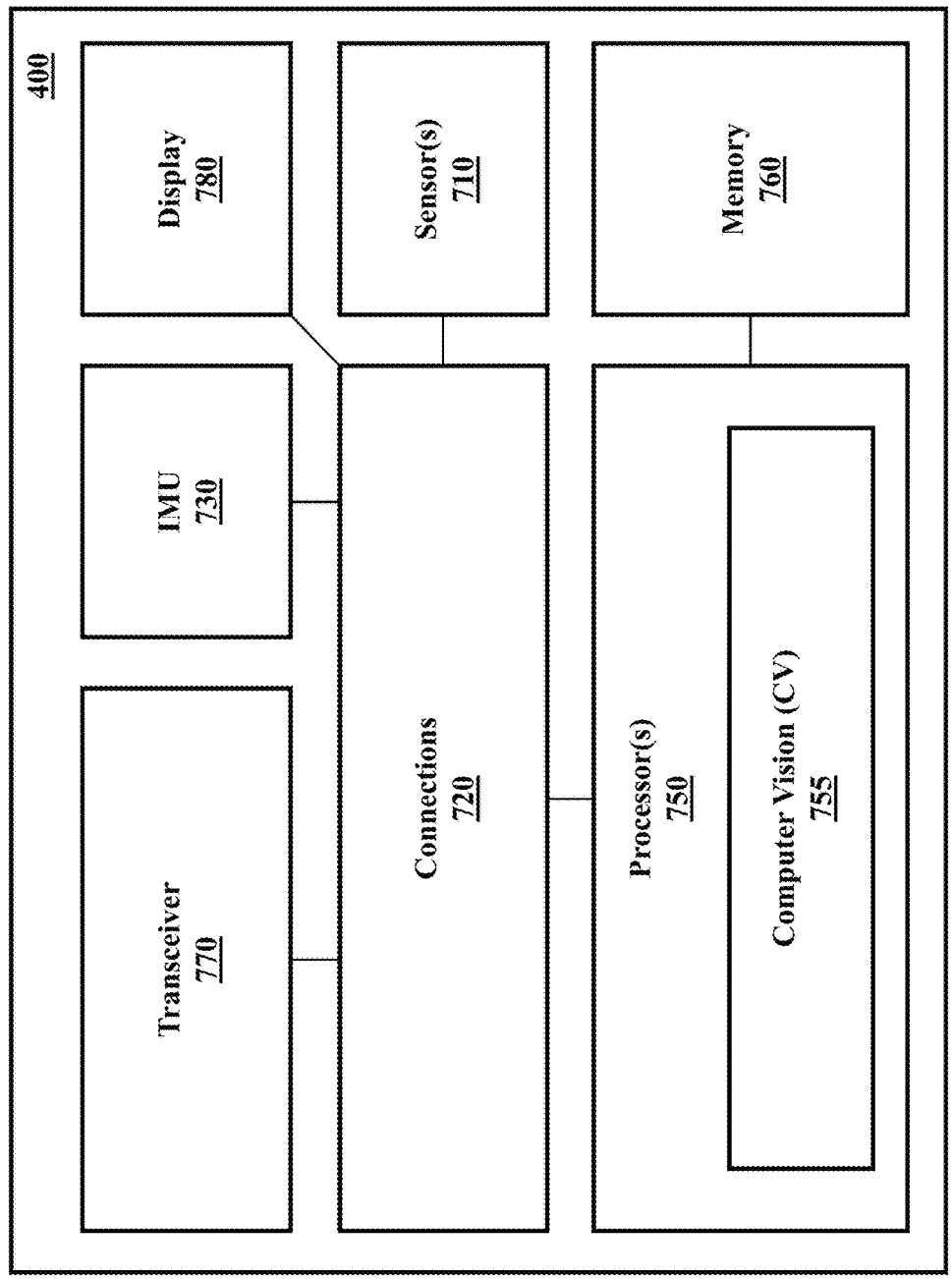

FIG. 7 is a block diagram of an exemplary system configured for registering images and executing a computer vision action based on results of the registration according to some embodiments of the invention.

Figure 1:
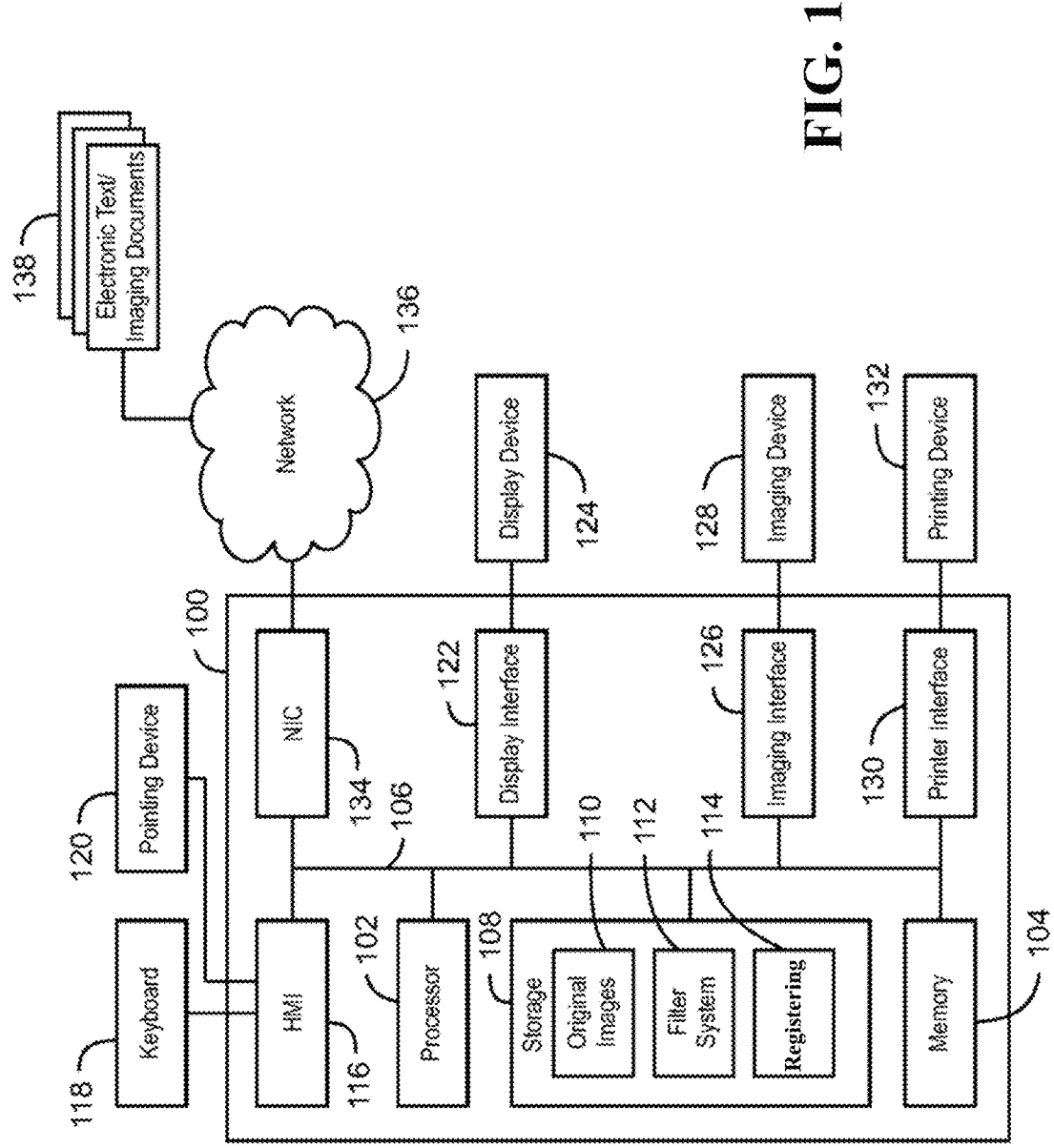
FIG. 1 is a block diagram of a computer system for image registration in accordance with some embodiments of the invention.

FIG. 1 shows a block diagram of a computer system 100 for image registration in accordance with some embodiments of the invention. In different embodiments the system 100 can have different combinations of some components described below and/or can be operatively connected to other systems performing axillary services for the system 100.

The computer system 100 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices. The instructions stored in the memory can be used by the processor to implement a method for image registration in accordance with some embodiments.

The computer system 100 can also include a storage device 108 adapted to store the original images 110, a filter 112 for filtering the original image to produce the image suitable for the upsampling. For example, the filter can resize and align the original image with the images of the training data. The storage device 108 can also store the structure and parameters 114 of the registration. In various embodiments, the registration uses different threshold and/or weights that can be stored in the memory and/or storage device.

The storage device 108 can include a hard drive, an optical drive, a thumbdrive, an array of drives, or any combinations thereof. A human machine interface 116 within the computer system 100 can connect the system to a keyboard 118 and pointing device 120, wherein the pointing device 120 can include a mouse, trackball, touchpad, joy stick, pointing stick, stylus, or touchscreen, among others. The computer system 100 can be linked through the bus 106 to a display interface 122 adapted to connect the system 100 to a display device 124, wherein the display device 124 can include a computer monitor, camera, television, projector, or mobile device, among others.

The computer system 100 can also be connected to an imaging interface 126 adapted to connect the system to an imaging device 128. In one embodiment, the image for upsampling is received from the imaging device. The imaging device 128 can include a camera, computer, scanner, mobile device, webcam, or any combination thereof. In one embodiment, the system 100 is part of the camera. A printer interface 130 can also be connected to the computer system 100 through the bus 106 and adapted to connect the computer system 100 to a printing device 132, wherein the printing device 132 can include a liquid inkjet printer, solid ink printer, large-scale commercial printer, thermal printer, UV printer, or dye-sublimation printer, among others. A network interface controller 134 is adapted to connect the computer system 100 through the bus 106 to a network 136. Through the network 136, the images 138 including one or combination of the electronic text and imaging input documents can be downloaded and stored within the computer's storage system 108 for storage and/or further processing.

Figure 2:
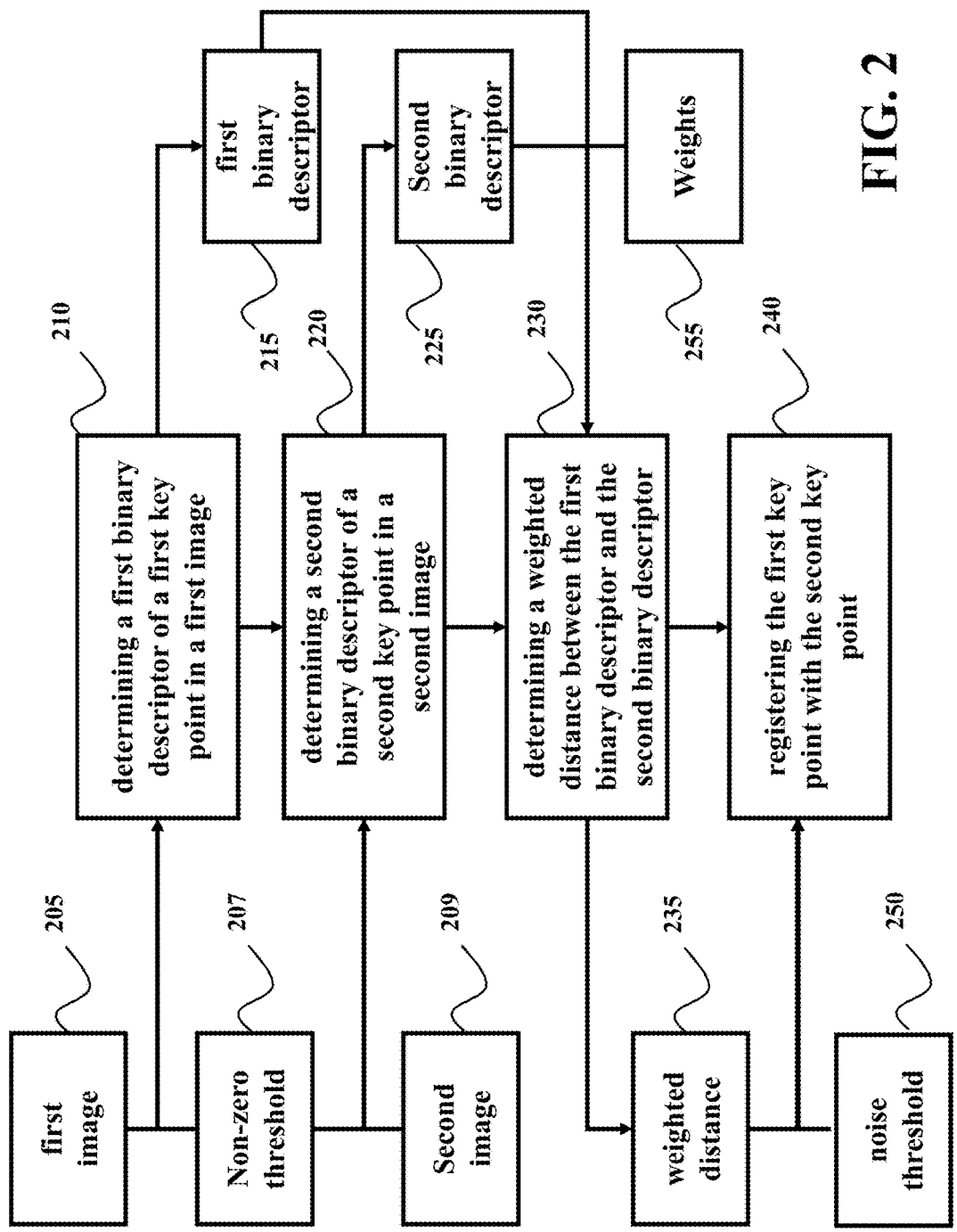
FIG. 2 is a block diagram of the image registrations method performed by a system of FIG. 1.

FIG. 2 shows a block diagram of the image registrations 114 method performed by a system 100 of FIG. 1. The method determines 210a first binary descriptor 215 of a first key point in a first image 205 and determines 220 a second binary descriptor 225 of a second key point in a second image 209. In various embodiments, at least one element in the first or the second binary descriptor is a result of a comparison of a difference between intensities of at least two pixels of the first or the second image with a non-zero threshold 207, i.e., the threshold 207 is greater than or equal to zero. To that end, the method determines the first and the second binary descriptors such that at least one element in the first binary descriptor is a result of a comparison of a difference between intensities of at least two pixels of the first image with the non-zero threshold, and at least one element in the second binary descriptor is a result of a comparison of a difference between intensities of at least two pixels of the second image with the threshold.

Some embodiments of the invention are based on recognition that the computation of the binary descriptor should be sensitive to a manner and/or timing of capturing the images causing various distortions of the images of the same scene. For example, intensities of pixels in the different images captured at different times can vary due to light variation at those times even if those pixels correspond to the same point in a scene. To that end, some embodiments realized that such variations can be learned and considered during the computation of the binary descriptors.

For example, one embodiment determines an $i^{th}$ element $b_i$ of the first or the second binary descriptors according to $$b_i = \begin{cases} 1 & \text{if } I(p_i) - I(q_i) > T, \\ 0 & \text{otherwise.} \end{cases}$$

wherein $I(p_i)$ and $I(q_i)$ are the intensities of the two pixels in the first or the second image, and wherein T is the threshold.

The method of FIG. 2 determines 230 a weighted distance 235 between the first binary descriptor 215 and the second binary descriptor 225. At least two weights 255 of the weighted distance for comparing at least two elements of the first and the second binary descriptors are different due to another realization that distortion of the images can affect pixels for different key points of the scene differently. For example, in a scene satisfying Manhattan assumption (consisting of buildings with orthogonal walls) the pixel differences along horizontal direction is more informative than pixels along a vertical direction. The weighted distance allows for determining different weights for comparing different elements of the binary vectors. The difference in the weights can encode the difference in importance of different pixel differences.

For example, one embodiment compares the binary descriptors using a weighted Hamming distance. The embodiment determines the weighted Hamming distance $H_w$ according to $$H_w = \sum_{i=1}^{N} w_i |f_1(i) - f_2(i)|,$$

wherein N is a size of the first and the second binary descriptors, e.g., 256, w is a weight vector, each element i of the weight vector stores a weight of the weighted Hamming distance between $i^{th}$ elements of the first binary descriptor $f_1(i)$ and the second binary descriptor $f_2(i)$.

Next, the method registers 240 the first key point with the second key point when the weighted distance 235 is below a noise threshold 250, which can be determined in advance. Separately or in combination, such a thresholded weighted difference improves the accuracy of the image registration using binary descriptors while maintaining its efficiency.

Some embodiments of the invention select a first set of key points in the first image and a second set of key points in the second image using at least one or combination of keypoint detectors such as FAST, SURF, or HARRIS and perform the image registration using various combination of pairs of key points from the first and the second set.

For example, one embodiment selecting a first patch of the first image that includes the first key point and a second patch of the second image that includes the second key point, and determine the first or the second binary descriptors by comparing intensities of at least some pixels from the first or the second patch.

Figure 3:
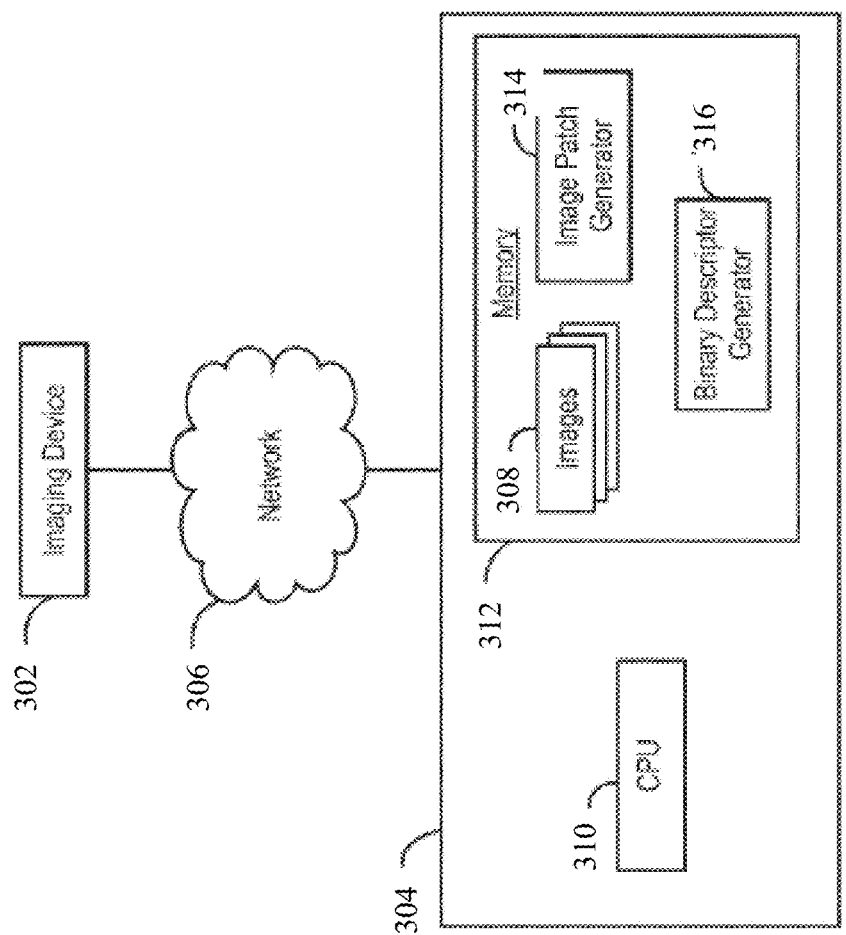
FIG. 3 is a block diagram of a system adapted to generate a binary descriptor representing an image patch, in accordance with some embodiments of the invention.

FIG. 3 shows a block diagram of a system 300 adapted to generate a binary descriptor representing an image patch corresponding to a keypoint, in accordance with embodiments of the invention. The system 300 can be part of or operatively connected to the system 100. The system 300 may include an imaging device 302 in communication with a computing system 304. The computing system 304 may be any type of computing device that is capable of implementing the embodiments described herein, such as a laptop computer, desktop computer, tablet computer, mobile device, or the like. The imaging device 302 may be any type of imaging device that is capable of capturing images 308 and transmitting such images 308 to the computing system 304.

In the embodiment shown in FIG. 3, the imaging device 302 is in communication with the computing system 304 via a network 306. However, in alternate embodiments, the imaging device 302 may be in communication with the computing system 304 via an imaging device interface (not shown), or may reside directly within the computing system 304.

The computing system 304 may include a central processing unit (CPU) 310 and a memory 312. The memory 312 may be any type of addressable electronic storage such as a random access memory (RAM), read-only memory (ROM), hard disk drives, removable discs, solid-state memory, or the like.

The memory 312 may include an image patch generator 314, a binary descriptor generator 316, and the images 308 received from the imaging device 302. The image patch generator 314 may be adapted to generate a number of image patches for an image 308. Each image patch may be centered on a specific key point identified within the image 308. The binary descriptor generator 316 may be adapted to generate a binary descriptor representing each image patch. The binary descriptor may be generated using binary strings, or bit strings, that are created for specific groups of pixels within an image patch.

Figure 4:
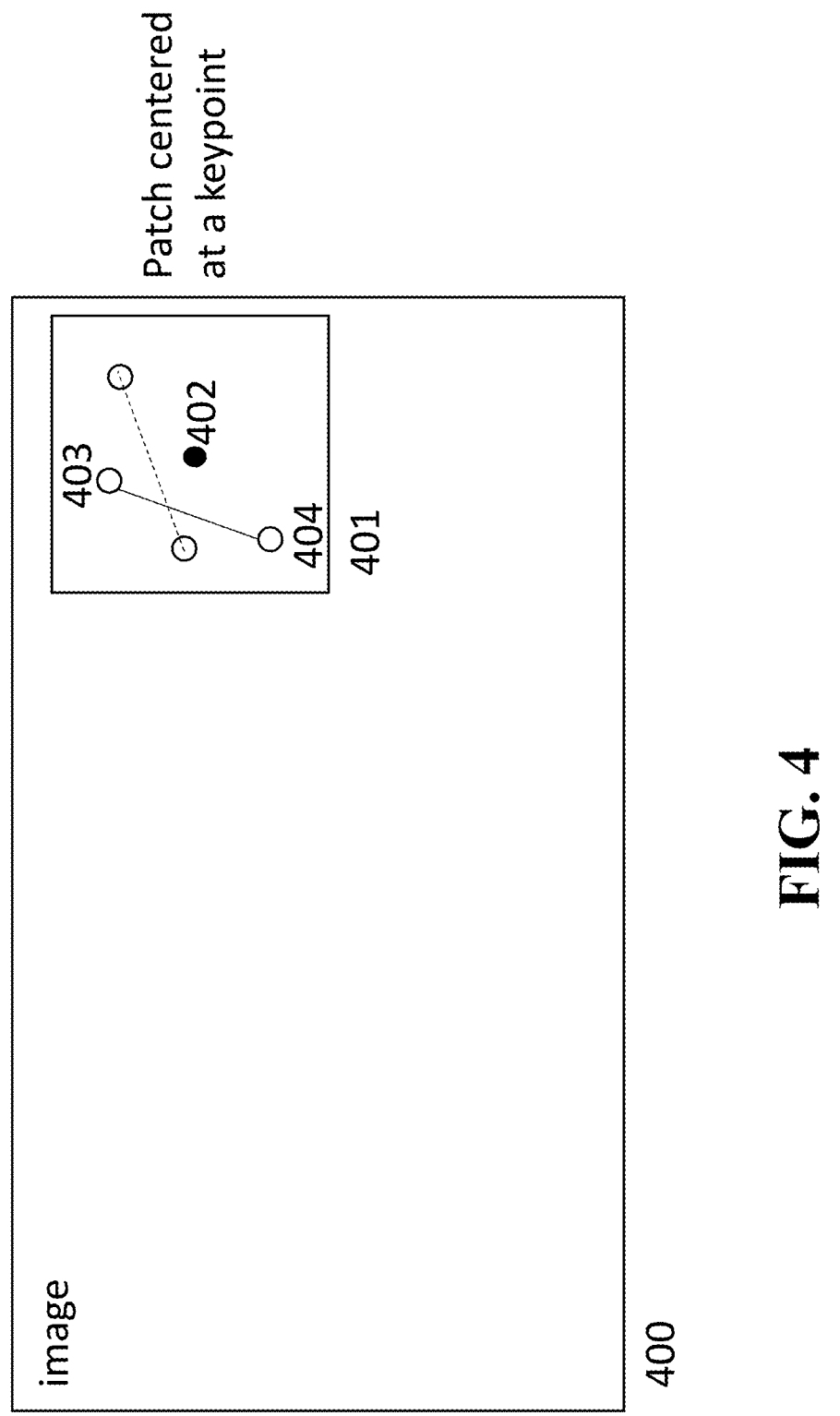
FIG. 4 is a schematic of a decomposition of an image patch, in accordance with some embodiments of the present invention.

FIG. 4 shows a schematic of decomposition of an image patch 401 in an image 400, in accordance with embodiments of the present invention. The center of each patch corresponds to a detected keypoint 402. We consider many pairs of pixels 403 and 404 near a keypoint. The binary feature vector is obtained by finding differences between pixels 403 and 404 and comparing it with a learned threshold. The feature vector can have any number of pixel comparisons, for example, 256 such pairs.

Separately or in combination, such a thresholded weighted difference improves the accuracy of the image registration using binary descriptors while maintaining its efficiency. For example, one embodiment learns the weights of the weighted Hamming distance from training data using a max-margin network learning. During that learning, the embodiment can use different threshold values to improve the registration.

Figure 5:
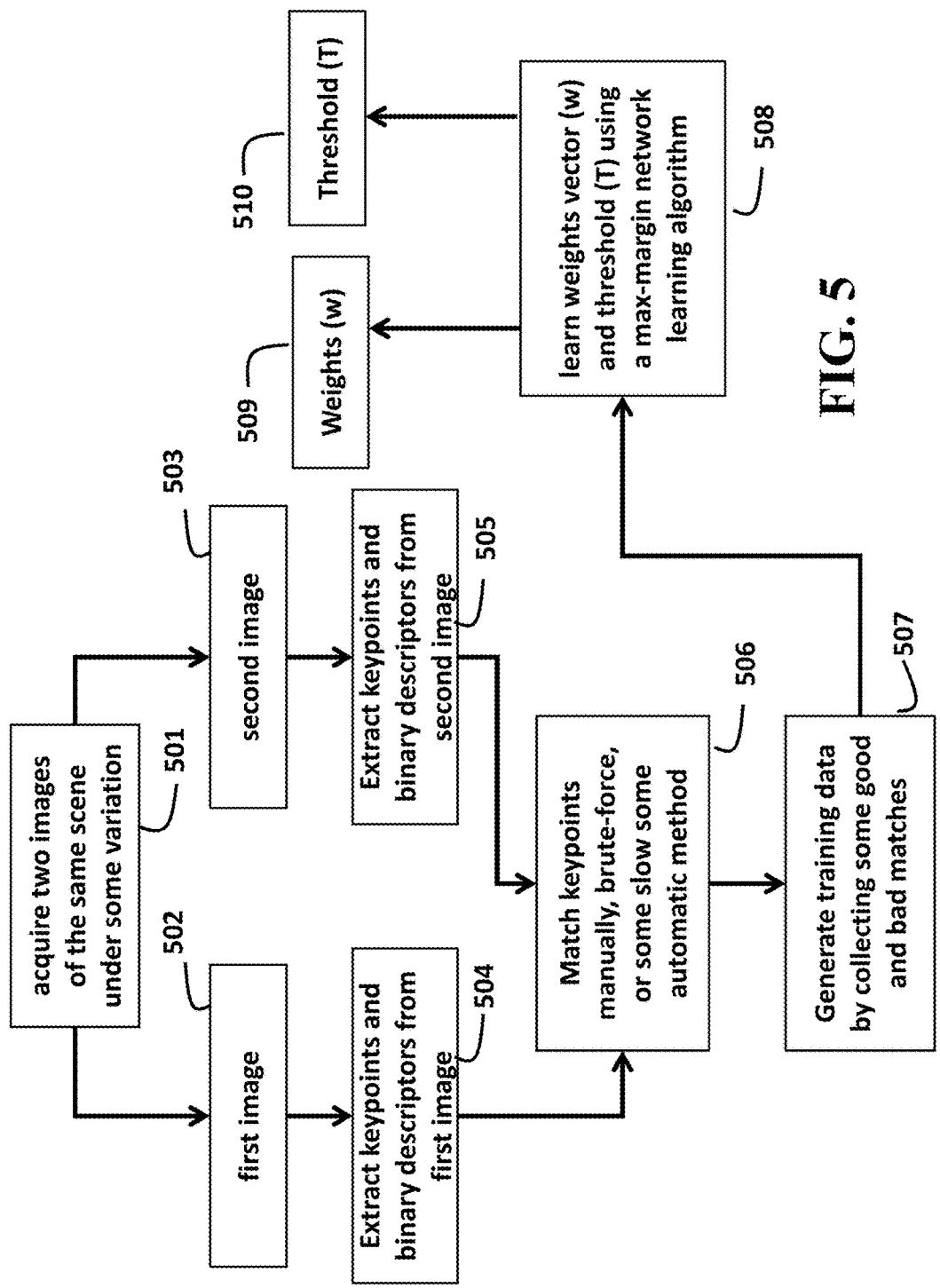
FIG. 5 is a block diagram of a method for determining weights of the weighted distance and threshold for building binary descriptors, according to one embodiment of the invention.

FIG. 5 shows a block diagram of a method for determining weights according to one embodiment of the invention. In order to learn the weights, one embodiment generates training data. An image acquisition system 501 obtains images of the same scene under some variation. The method extracts the keypoints and binary descriptor 504 from the first images 502 and extracts keypoints and descriptors 505 from the second image 503. The correspondence 506 between the keypoints in the first and second images is determined using manual input or through some accurate matching algorithm, which need not be computationally efficient. The training data 507 is generated using some good and bad keypoint matches.

One embodiment uses a max-margin network learning algorithm 508 to compute both weights and thresholds as: Given training data D={$x_i,y_i$},i={1, ..., n}, 507, some embodiment learn 508 weights 509 so that the weighted Hamming distance for correct matches is smaller than the distance for the incorrect matches. Here, $x_i$ and $y_i$ are 256×1 binary vectors for n correct keypoint matches.

One embodiment formulates the problem of learning the weights using a max-margin network learning as $$\min_{w,b,\varepsilon} \frac{1}{2} w^T w + C \sum_{i=1}^{n} \varepsilon_i$$

s.t.

$$H_w(x_i, y_i) + b \leq -1 + \varepsilon_i$$

$$H_w(x_i, y_j) + b \geq 1 - \varepsilon_i, \forall j \neq i$$

$$\varepsilon_i \geq 0.$$

Here $\varepsilon_i$ is a slack variable, C is the soft margin parameter in the max-margin network learning, w is a set of weights we learn, and b is a bias term.

For example, to learn the weights, one embodiments use two negative cases of $H_w(x_i,y_j)$ for every positive case of $H_w(x_i,y_i)$. The positive case of $H_w(x_i,y_i)$ is a correct match between source and target descriptors $x_i$ and $y_i$. This is given from ground truth data. The two negative cases used for learning are the target descriptors which have the smallest and second smallest Hamming distance to the source descriptor, where j≠i. One embodiment uses the same max-margin network learning 508 to learn the threshold 510.

The optimization problem for threshold learning can be formulated as follows. Given some training data D={$d_{i1}$, $d_{i2}$}, i={1, ..., n}, learn a threshold T∈R. Here, $d_{i1}$ an $d_{i2}$ refer to 256×2 matrices storing the intensity values for 256 pairs of pixels used for determining the binary descriptors at two different matching keypoints. The learning problem can be formulated as:

$$\min_{T,b,\varepsilon} \sum_{i=1}^{n} \varepsilon_i$$

-continued $$H(x_i, y_i) + b \leq -1 + \varepsilon_i$$

$$H(x_i, y_j) + b \geq 1 - \varepsilon_i, \forall j \neq i$$

$$x_i(k) = \operatorname*{argmin}_{x_i(k) \in \{0,1\}} x_i(k)(d_{i1}(k,1) - d_{i1}(k,2) - T)$$

$$y_i(k) = \operatorname*{argmin}_{y_i(k) \in \{0,1\}} y_i(k)(d_{i2}(k,1) - d_{i2}(k,2) - T)$$

$$T \geq -256.0$$

$$T \leq 256.0$$

The threshold T takes only integer values, because the error does not change for any intermediate real values. One embodiment performs a brute-force search for different threshold values.

Combined Weight and Threshold Learning

The max-margin network learning algorithm 508 can also be used to simultaneously estimate both weights 509 and threshold 510. To combine both the weight and threshold learning, some embodiments formulate the optimization as follows. Given training data $D=\{d_{i1}, d_{i2}\}, i=\{1, \ldots, n\}$, learn the weight vector $w \in R^{256}$ and the threshold $T \in R$. Here, $d_{i1}$ an $d_{i2}$ refer to 256×2 matrices storing the intensity values for 256 pairs of pixels used for building the binary descriptors at two different matching keypoints.

For example the learning problem can be $$\min_{w,b,T,\varepsilon} \frac{1}{2} w^T w + C \sum_{i=1}^{n} \varepsilon_i$$

s.t.

$$H_w(x_i, y_i) + b \leq -1 + \varepsilon_i$$

$$H_w(x_i, y_j) + b \geq 1 - \varepsilon_i, \forall j \neq i$$

$$x_i(k) = \operatorname*{argmin}_{x_i(k) \in \{0,1\}} x_i(k)(d_{i1}(k,1) - d_{i1}(k,2) - T)$$

$$y_i(k) = \operatorname*{argmin}_{y_i(k) \in \{0,1\}} y_i(k)(d_{i2}(k,1) - d_{i2}(k,2) - T)$$

$$T \geq -256.0$$

$$T \leq 256.0$$

The above problem is non-convex which makes it difficult to obtain a globally optimal solution. To that end, one embodiment learns the threshold by enumerating over different integer values during the max-margin network learning. For example, when the embodiment fixes the threshold T to different integer values, his optimization problem becomes convex, similar to the weight learning method described above. Exploiting the integer nature of the threshold values, it can be learned via a brute force search.

Some embodiments of the invention use the image registration to execute a computer vision action. For example, the computer vision action includes one or combination of visual odometry, 3D reconstruction, object detection, object recognition, sensor fusion, and image-based localization.

Example Embodiments

Figure 6A:
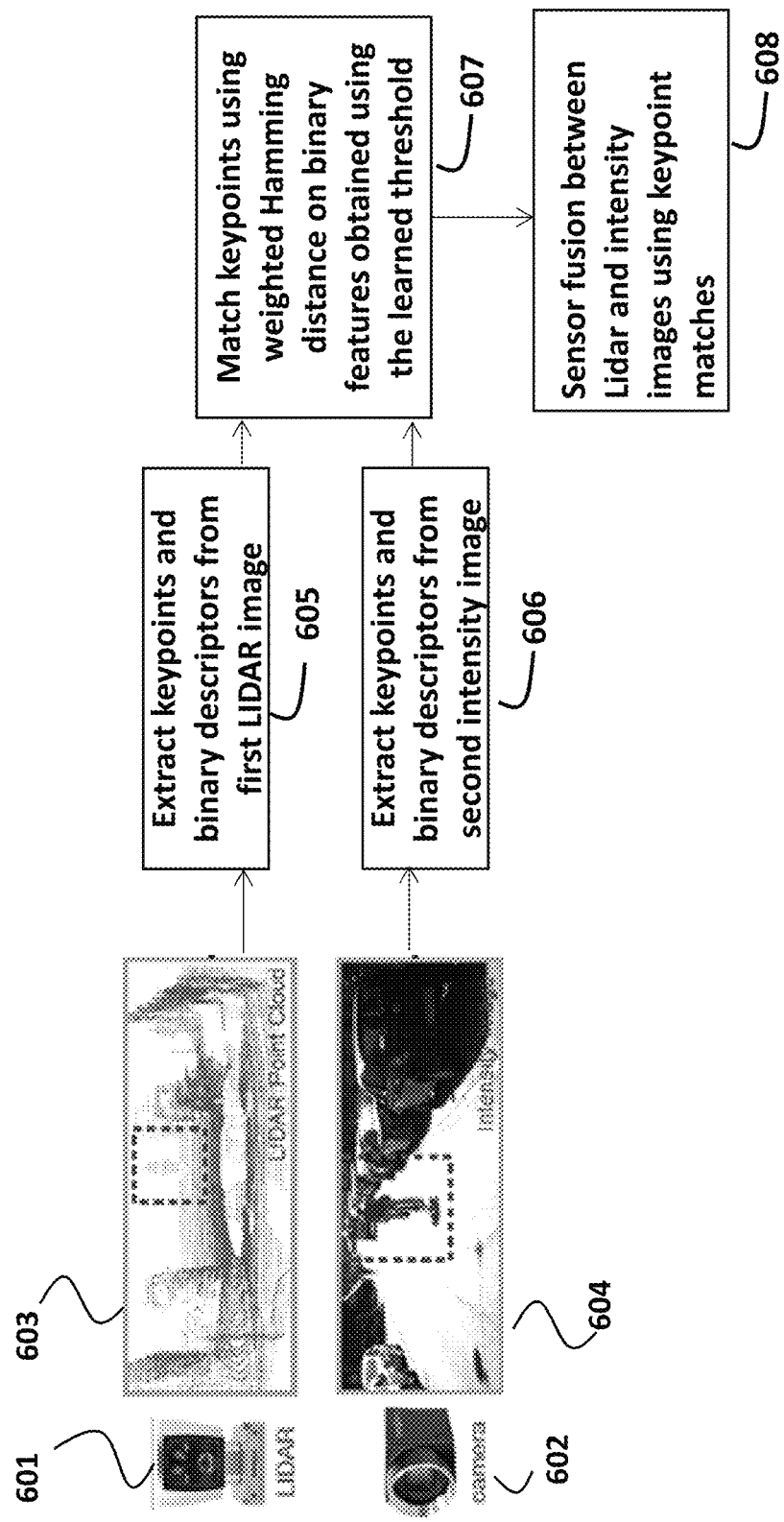
FIG. 6A is a schematic of a system according to one embodiment of the invention about fusion of LIDAR and intensity image sensors.

FIG. 6 shows a schematic of a system according to one embodiment of the invention. The system includes a first sensor 601 to measure a scene to produce a first set of measurements 603 of the scene and a second sensor 602 to measure the scene to produce a second set measurements 604 of the scene. For example, the first sensor 601 is a LIDAR and the second sensor 602 is a camera. The system extracts keypoints and descriptors 605 from the LIDAR image. Similarly, the system extracts keypoints and descriptors 606 from the intensity image. The system uses weighted hamming distance 607 to match the LIDAR and intensity image. Using the matches, the system can obtain sensor fusion 608.

Figure 6B:
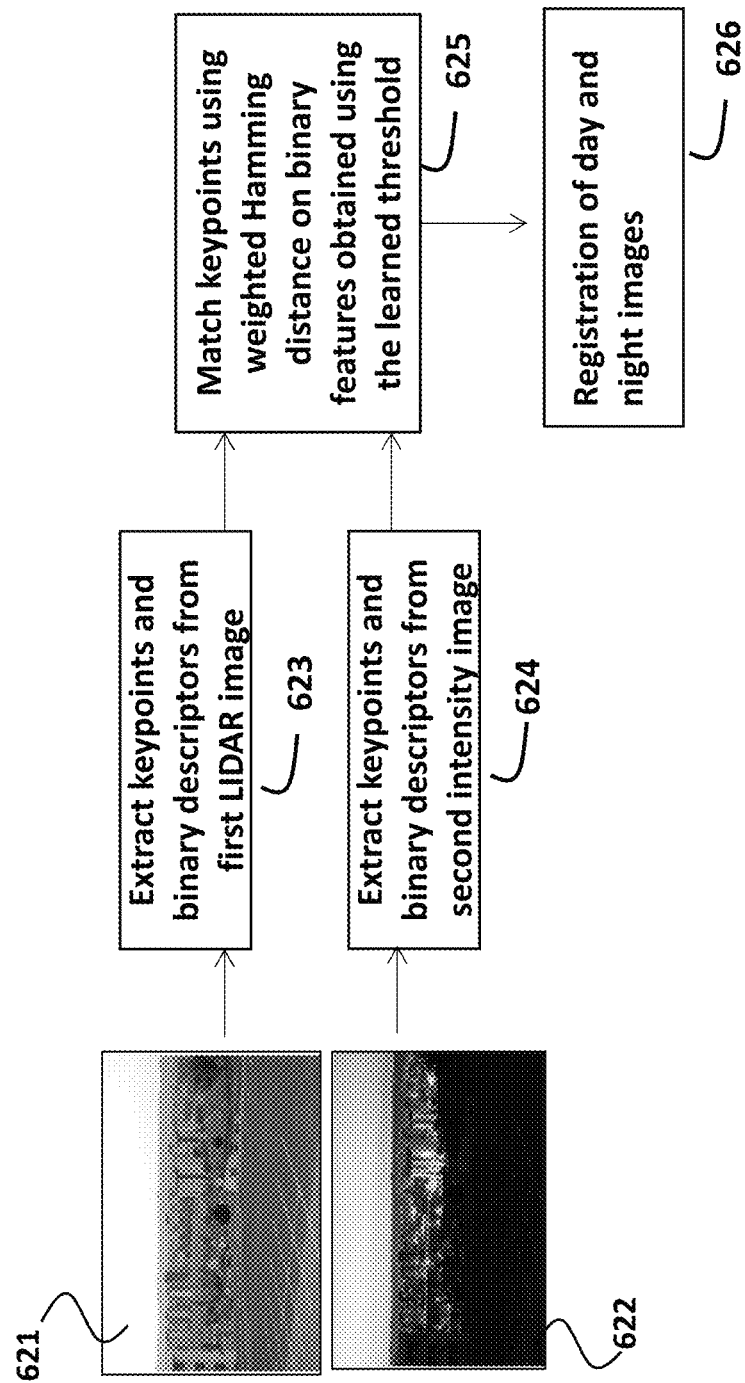
FIG. 6B is a schematic of a system according to one embodiment of the invention of the registration of day and night time images.

FIG. 6B shows a schematic of a system according to another embodiment of the invention. The system acquires a day time image 621 and a night time image 622. The system extracts keypoints and descriptors 623 from the day time image and extracts keypoints and descriptors 624 from the night time image. The system uses the weighted hamming distance 625 to compute matches between the keypoints and obtains the registration of the day time and the night times 626.

To that end, various embodiments can also learn different weights and thresholds for different scenarios such as the registration of day time and night images, registration of LIDAR and intensity images. For example, one embodiment acquires the first and the second images captured with a camera at different points of time and selects, from a memory operatively connected with the processor, at least one of the threshold, the noise threshold, and the weights of the weighted Hamming distance based on a function the points of time. For example, the memory stores different values of at least one of the threshold, the noise threshold, and the weights of the weighted Hamming distance for images captured at different times of a date, at different seasons of the year, at different lighting conditions, and for different types of scenes.

FIG. 7 shows a block diagram of an exemplary system 700 configured for registering images and executing a computer vision action based on results of the registration according to some embodiments of the invention. The system 700 can be implemented internal to the system 100. Additionally, or alternatively, the system 700 can be communicatively connected to the interfaces of the system 100.

The system 700 can include one or combination of a camera 710, an inertial measurement unit (IMU) 730, a processor 750, a memory 760, a transceiver 770, and a display/screen 780, which can be operatively coupled to other components through connections 720. The connections 720 can comprise buses, lines, fibers, links or combination thereof.

The transceiver 770 can, for example, include a transmitter enabled to transmit one or more signals over one or more types of wireless communication networks and a receiver to receive one or more signals transmitted over the one or more types of wireless communication networks. The transceiver 770 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 700 can comprise image sensors such as CCD or CMOS sensors, lasers and/or camera 710, which are hereinafter referred to as "sensor 710". For example, the sensor 710 can convert an optical image into an electronic or digital image and can send acquired images to processor 750. Additionally, or alternatively, the sensor 710 can sense the light reflected from a target object in a scene and submit the intensities of the captured light to the processor 750.

For example, the sensor 710 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 710 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 710. For example, in some embodiments, the sensor 710 includes RGBD cameras, which may capture per-pixel depth (D) information when the depth sensor is enabled, in addition to color (RGB) images.

As another example, in some embodiments, the sensor 710 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 710. Depth information can be obtained by measuring the time that the light pulses take to travel to the objects and back to the sensor.

As a further example, the depth sensor can take the form of a light source coupled to the sensor 710. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 710 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 700 can be operatively connected to multiple sensors 710, such as dual front cameras and/or a front and rear-facing cameras, which may also incorporate various sensors. In some embodiments, the sensors 710 can capture both still and video images. In some embodiments, the sensor 710 can include RGBD or stereoscopic video cameras capable of capturing images at, e.g., 30 frames per second (fps). In one embodiment, images captured by the sensor 710 can be in a raw uncompressed format and can be compressed prior to being processed and/or stored in memory 760. In some embodiments, image compression can be performed by the processor 750 using lossless or lossy compression techniques.

In some embodiments, the processor 750 can also receive input from IMU 730. In other embodiments, the IMU 730 can comprise 3-axis accelerometer(s), 3-axis gyroscope(s), and/or magnetometer(s). The IMU 730 can provide velocity, orientation, and/or other position related information to the processor 750. In some embodiments, the IMU 730 can output measured information in synchronization with the capture of each image frame by the sensor 710. In some embodiments, the output of the IMU 730 is used in part by the processor 750 to fuse the sensor measurements and/or to further process the fused measurements.

The system 700 can also include a screen or display 780 rendering images, such as color and/or depth images. In some embodiments, the display 780 can be used to display live images captured by the sensor 710, fused images, augmented reality (AR) images, graphical user interfaces (GUIs), and other program outputs. In some embodiments, the display 780 can include and/or be housed with a touchscreen to permit users to input data via some combination of virtual keyboards, icons, menus, or other GUIs, user gestures and/or input devices such as styli and other writing implements. In some embodiments, the display 780 can be implemented using a liquid crystal display (LCD) display or a light emitting diode (LED) display, such as an organic LED (OLED) display. In other embodiments, the display 780 can be a wearable display.

In some embodiments, the result of the fusion can be rendered on the display 780 or submitted to different applications that can be internal or external to the system 700. For example, a computer vision (CV) application 755 running on the processor 750 can implement and execute computer vision based tracking, model-based tracking, and/or simultaneous localization and mapping (SLAM) methods.

Exemplary system 700 can also be modified in various ways in a manner consistent with the disclosure, such as, by adding, combining, or omitting one or more of the functional blocks shown. For example, in some configurations, the system 700 does not include the IMU 730 or the transceiver 770. Further, in certain example implementations, the system 700 include a variety of other sensors (not shown) such as an ambient light sensor, microphones, acoustic sensors, ultrasonic sensors, laser range finders, etc. In some embodiments, portions of the system 700 take the form of one or more chipsets, and/or the like.

The processor 750 can be implemented using a combination of hardware, firmware, and software. The memory 760 can be implemented within the processor 750 and/or external to the processor 750. In some embodiments, the memory 760 holds program codes that facilitate sensor fusion and/or one or more image processing, perform SLAM, tracking, 3D reconstruction, and other tasks performed by CV 755 on processor 750.

In some embodiments, the CV 755 can implement various computer vision methods and/or process images captured by the sensor 710. For example, the CV 755 can be configured for processing one or more images captured by the sensor 710 to perform reconstruction of an environment being modeled using the depth information associated with the captured images.

Based on the depth data, during reconstruction each pixel can be assigned a 3D coordinate. In one embodiment, the CV 755 on the processor 750 tracks the position of the camera 710 by using a monocular (single camera) visual SLAM system to build a coarse map of the environment around the MS for accurate and robust 6DOF tracking of camera 710. The term monocular refers to the use of a single non-stereoscopic camera to capture images or to images captured without depth information. Other reconstruction method can then use the camera pose and per-pixel depth information to extrude the captured image(s) along a viewing direction. For example, in one embodiment the processor 750 is configured to track an object in the scene using the fused set of measurements.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component.

Though, a processor may be implemented using circuitry in any suitable format. Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A method for image registrations, comprising:
   determining a first binary descriptor of a first key point in a first image, wherein at least one element in the first binary descriptor is a result of a comparison of a difference between intensities of at least two pixels of the first image with a threshold;
   determining a second binary descriptor of a second key point in a second image, wherein at least one element in the second binary descriptor is a result of a comparison of a difference between intensities of at least two pixels of the second image with the threshold;
   determining a weighted distance between the first binary descriptor and the second binary descriptor, wherein at least two weights of the weighted distance for comparing at least two elements of the first and the second binary descriptors are different;
   registering the first key point with the second key point when the weighted distance is below a noise threshold, wherein at least some steps of the method are performed using a processor; and
   executing a computer vision action based on the image registrations, wherein the computer vision action includes one or combination of visual odometry, 3D reconstruction, object detection, object recognition, sensor fusion, and image-based localization.

2. The method of claim 1, further comprising:
   selecting a first set of key points in the first image and a second set of key points in the second image using at least one or combination of HARRIS, FAST, or SURF keypoint detectors; and
   repeating the determining steps for each combination of pairs of key points from the first and the second set to register the pairs of key points with the weighted distance below the noise threshold.

3. The method of claim 2, further comprising:
   selecting a first patch of the first image that includes the first key point;
   selecting a second patch of the second image that includes the second key point;
   determining the first binary descriptors by comparing intensities of at least some pixels from the first patch; and
   determining the second binary descriptors by comparing intensities of at least some pixels from the second patch.

4. The method of claim 1, wherein the weighted distance is a weighted Hamming distance $H_w$ determined according to $$H_w = \sum_{i=1}^{N} w_i |f_1(i) - f_2(i)|,$$

wherein N is a size of the first and the second binary descriptors, w is a weight vector, each element i of the weight vector stores a weight of the weighted Hamming distance between $i^{th}$ elements of the first binary descriptor $f_1(i)$ and the second binary descriptor $f_2(i)$.

5. The method of claim 4, wherein N equals 256, and wherein the threshold is greater than zero.

6. The method of claim 1, wherein an $i^{th}$ element $b_i$, of the first or the second binary descriptors is determined according to $$b_i = \begin{cases} 1 & \text{if } I(p_i) - I(q_i) > T, \\ 0 & \text{otherwise.} \end{cases}$$

wherein $I(p_i)$ and $I(q_i)$ are the intencities of the two pixels in the first or the second image, and wherein T is the threshold.

7. The method of claim 1, further comprising:
   acquiring the first and the second images captured with a camera at different points of time; and
   selecting, from a memory operatively connected with the processor, at least one of the threshold, the noise threshold, and the weights of the weighted Hamming distance based on a function the points of time.

8. The method of claim 7, wherein the memory stores different values of at least one of the threshold, the noise threshold, and the weights of the weighted Hamming distance for images captured at different times of a date, at different seasons of the year, at different lighting conditions, and for different types of scenes.

9. The method of claim 1, wherein the weights of the weighted Hamming distance are learned from training data using a max-margin network learning.

10. The method of claim 9, wherein the threshold is learned by enumerating over different integer values during the max-margin network learning.

11. A system for image registrations, comprising:
an input interface for acquiring a first image and a second image; and
a process for determining a first binary descriptor of a first key point in a first image, determining a second binary descriptor of a second key point in a second image, determining a weighted Hamming distance between the first binary descriptor and the second binary descriptor, and registering the first key point with the second key point when the weight Hamming distance is below a noise threshold, wherein at least one element in the first or the second binary descriptor is a result of a comparison of a difference between intensities of at least two pixels of the first or the second image with a non-zero threshold, and wherein at least two weights of the weighted Hamming distance for comparison at least two elements of the first or the second binary descriptors are different; and
an output interface for executing a computer vision action based on the image registrations, wherein the computer vision action includes one or combination of visual odometry, 3D reconstruction, object detection, object recognition, sensor fusion, and image-based localization.

12. A camera including the system of claim 11.

13. The system of claim 11, further comprising:
a memory to store different values of at least one of the threshold, the noise threshold, and the weights of the weighted Hamming distance for images captured at different times of a date, at different seasons of the year, at different lighting conditions, and for different types of scenes.

14. The system of claim 13, wherein the processor is configured to
determine points of time of capturing the first and the second images; and
select, from the memory, at least one of the threshold, the noise threshold, and the weights of the weighted Hamming distance based on a function the points of time.

15. The system of claim 11, wherein the weighted Hamming distance $H_w$ is determined according to $$H_w = \sum_{i=1}^{N} w_i |f_1(i) - f_2(i)|,$$

wherein N is a size of the first and the second binary descriptors, w is a weight vector, each element i of the weight vector stores a weight of the weighted Hamming distance between $i^{th}$ elements of the first binary descriptor $f_1(i)$ and the second binary descriptor $f_2(i)$.

16. The system of claim 15, wherein N equals 256.

17. The system of claim 11, wherein an $i^{th}$ element $b_i$, of the first or the second binary descriptors is determined according to $$b_i = \begin{cases} 1 & \text{if } I(p_i) - I(q_i) > T, \\ 0 & \text{otherwise.} \end{cases}$$

wherein $I(p_i)$ and $I(q_i)$ are the intencities of the two pixels in the first or the second image, and wherein T is the threshold.

18. A non-transitory computer readable storage medium embodied thereon a program executable by a processor for performing a method, the method comprising:
determining a first binary descriptor of a first key point in a first image, wherein at least one element in the first binary descriptor is a result of a comparison of a difference between intensities of at least two pixels of the first image with a threshold;
determining a second binary descriptor of a second key point in a second image, wherein at least one element in the second binary descriptor is a result of a comparison of a difference between intensities of at least two pixels of the second image with the threshold;
determining a weighted Hamming distance between the first binary descriptor and the second binary descriptor, wherein at least two weights of the weighted Hamming distance for comparing at least two elements of the first and the second binary descriptors are different;
registering the first key point with the second key point when the weighted Hamming distance is below a noise threshold; and
executing a computer vision action based on the image registrations, wherein the computer vision action includes one or combination of visual odometry, 3D reconstruction, object detection, object recognition, sensor fusion, and image-based localization.

* * * * *